United States Patent
Nagae

(10) Patent No.: US 6,209,910 B1
(45) Date of Patent: Apr. 3, 2001

(54) IGNITION CONTROL SYSTEM FOR A PASSIVE SAFETY DEVICE

(75) Inventor: Norihiko Nagae, Seto (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/299,277

(22) Filed: Apr. 26, 1999

(30) Foreign Application Priority Data

May 14, 1998 (JP) .................................................. 10-131487

(51) Int. Cl.[7] .................................................... B60R 21/32
(52) U.S. Cl. ............................................ 280/735; 180/282
(58) Field of Search ................................ 280/734, 735; 701/45; 180/272, 282

(56) References Cited

U.S. PATENT DOCUMENTS

| | | |
|---|---|---|
| 5,610,575 | 3/1997 | Gioutsos . |
| 5,631,834 | 5/1997 | Tsurushima et al. . |
| 5,788,270 | 8/1998 | HÅland et al. . |
| 5,835,873 * | 11/1998 | Darby et al. ............................ 701/45 |

FOREIGN PATENT DOCUMENTS

| | | |
|---|---|---|
| 298 01 120 U | 4/1998 | (DE) . |
| 0805074 | 11/1997 | (EP) . |
| 7-277139 | 10/1995 | (JP) . |
| 9-139777 | 5/1997 | (JP) . |
| 9-240399 | 9/1997 | (JP) . |
| WO 96/26087 | 8/1996 | (WO) . |

* cited by examiner

Primary Examiner—Paul N. Dickson
Assistant Examiner—Faye M. Fleming
(74) Attorney, Agent, or Firm—Kenyon & Kenyon

(57) ABSTRACT

An ignition control system has an airbag control device and a roll-over control device. The airbag control device and the roll-over control device are interconnected by a communication line. The specification of communication between the control devices is set so that the operation of the airbag control device is the same when the roll-over control device is provided as it would be were the roll-over control device not provided. When a roll-over of the vehicle occurs, first and second switching element are turned on, so that ignition current is supplied from a backup capacitor. During diagnostics, the second switching element remains off.

6 Claims, 3 Drawing Sheets

IGNITION CONTROL SYSTEM FOR A PASSIVE SAFETY DEVICE

BACKGROUND OF THE INVENTION

1. Field of the Invention

The present invention relates to an ignition control system for a passive safety device and, more particularly, to an ignition control system suitable for ignition control of a passive safety device that includes a head protecting airbag device.

2. Description of the Related Art

A passive safety device including a head protecting airbag is described in, for example, WO 96/26087. In such a passive safety device, the head protecting airbag is housed extending along a front pillar and a roof side rail of a vehicle. If a side impact on the vehicle or a roll-over of the vehicle is detected, the head protecting airbag is deployed into a space between the head of an occupant and a side portion of the vehicle. Thus, the head protecting airbag appropriately protects an occupant's head at the time of occurrence of a side impact or a roll-over.

For effective operation of the above-described passive safety device, it is necessary or effective to provide a roll-over sensor that precisely detects a roll-over of a vehicle and to provide a seatbelt pretensioner that operates, upon detection of a roll-over, to restrain an occupant from moving sideways relative to the vehicle so as to secure a space between a vehicle side portion and the occupant into which the head protecting airbag is deployed. The head protecting airbag is operated to protect an occupant's head not only at the time of a roll-over but also at the time of a side impact. Therefore, in some passive safety device ignition control systems, a roll-over sensor is omitted, and the head protecting airbag is operated only when a side impact is detected.

That is, the passive safety device ignition control systems can be divided into two types: basic systems which detect the occurrence of frontal impacts and the occurrence of side impacts and, on the basis of the information detected regarding impact, control the operation of a frontal impact airbag, a side impact airbag, a head protecting airbag and a seatbelt pretensioner (hereinafter, the functions will be referred to as "basic functions"); expanded systems which, in addition to the basic functions, detect the occurrence of a roll-over and, on the basis of the information detected regarding roll-over, control the head protecting airbag and the seatbelt pretensioner (hereinafter, the functions will be referred to as "roll-over functions").

Since the head protecting airbag and the seatbelt pretensioner need to operate at the time of a side impact and at the time of a roll-over as described above, the ignition circuit provided in a basic system has the function of igniting the head protecting airbag and the seatbelt pretensioner. Therefore, expanded systems are analogous to a basic system to which a roll-over detecting sensor has been added and which, and at the time of detection of a roll-over, employs the ignition circuit of the basic system to ignite the head protecting airbag and the seatbelt pretensioner.

However, if such an expanded system with the roll-over detecting function is adopted, the electrical conditions of the ignition circuit, such as the impedance thereof and the like, change from those of the ignition circuit in a system without the roll-over detecting function. Therefore, it becomes necessary to adjust the circuit constants or factors of the ignition circuit, and the like, in accordance with whether the ignition circuit is used by the basic system or the expanded system.

As a result, there arises the danger of causing drawbacks, such as a cost increase of the ignition control system and the like.

SUMMARY OF THE INVENTION

Accordingly, it is an object of the present invention to provide an ignition control system for a passive safety device of a vehicle that eliminates the need to adjust a device that realizes the basic functions in accordance with whether the roll-over function is provided, thereby allowing a cost reduction.

According to one aspect of the invention, there is provided an ignition control system for a vehicular passive safety device, including a first controller that controls a first passive safety device on the basis of a first dangerous state of a vehicle, a second controller that controls a second passive safety device having at least a portion of the first passive safety device on the basis of a second dangerous state of the vehicle, and a communication interface enabling communication between the first controller and the second controller. A communication specification of the communication interface is set such that control by the first controller remains unchanged whether or not the second controller is provided.

In this ignition control system, the specification of the communication between the first controller and the second controller is set such that the operation of the first controller is not affected by whether the second controller is provided. Therefore, the ignition control system eliminates the need to adjust the first controller in accordance with whether the second controller is provided. As a result, the first controller can be applied to a wide variety of ignition control systems with various specifications or designs, and the cost of the system can be reduced.

According to another aspect of the invention, there is provided an ignition control system for a passive safety device, including an airbag controller that controls an operation of an impact passive safety device including at least an impact airbag, a seatbelt pretensioner and a head protecting airbag, on the basis of an impact condition occurring to a vehicle, a roll-over controller that controls an operation of a roll-over passive safety device having at least a portion of the impact passive safety device that includes the head protecting airbag, on the basis of a roll-over occurring to the vehicle, and a communication interface enabling communication between the airbag controller and the roll-over controller. A communication specification of the communication interface is set such that control by the airbag controller remains unchanged by whether the roll-over controller is provided.

In this ignition control system, the specification of the communication between the airbag control device and the roll-over controller is set such that the operation of the airbag controller is not affected by whether the roll-over controller is provided. Therefore, the ignition control system eliminates the need to adjust the airbag controller in accordance with whether the roll-over controller is provided. As a result, the airbag controller can be applied to a wide variety of ignition control systems with various specifications or designs, and the cost of the system can be reduced.

The above-described ignition control system may further have a construction as follows. That is, the roll-over controller may include a power source device, a roll-over power source supply passage that supplies a power from the power source device to the airbag controller, and a switch that switches the roll-over power supply passage between a connected state and a disconnected state. The airbag controller performs a diagnostic of the ignition controller system when the roll-over power supply passage is disconnected by the switch.

If the roll-over power supply passage is disconnected, the roll-over controller no longer have an electrical effect on the airbag controller. Therefore, it becomes unnecessary to adjust the parameters related to the diagnostics of the airbag controller in accordance with whether the roll-over controller is provided.

The above-described ignition control system may further have a construction as follows. That is, the airbag controller performs an early diagnostic with respect to the ignition control system immediately after an ignition switch of the vehicle is turned on, and the airbag controller transmits a diagnostic completion signal to the roll-over controller after performing the early diagnostic. The roll-over controller performs an early diagnostic with respect to a component part other than the switch, in parallel with the early diagnostic performed by the airbag controller, and performs the early diagnostic with respect to the switch after receiving the diagnostic completion signal from the airbag controller.

Therefore, the early diagnostic by the airbag controller and the early diagnostic by the roll-over controller can be performed in parallel without having an electrical effect on each other. Since the early diagnostics by the airbag control device and the roll-over controller, excluding the diagnostic of the switch, are performed in parallel, the time required for the early diagnostics is reduced. Furthermore, since the specification of the communication between the airbag controller and the roll-over controller is set so that the operation of the airbag controller is not affected by whether the roll-over controller is provided, the adjustment of the airbag controller in accordance with whether the roll-over controller is provided is also unnecessary in the construction in which the airbag controller transmits the diagnostic completion signal to the roll-over controller.

The above-described ignition control system may also have a construction as follows. That is, upon detecting occurrence of a roll-over of the vehicle, the roll-over controller connects the roll-over power supply passage by using the switch, and transmits a roll-over occurrence signal to the airbag control device. Upon receiving the roll-over occurrence signal, the airbag control device supplies an ignition current to the roll-over passive safety device by using a power supplied from the roll-over controller.

Therefore, if the roll-over power supply passage is connected, a power is supplied to the airbag controller. Upon receiving the roll-over occurrence signal, the airbag controller supplies the ignition current to the roll-over passive safety device by using the power from the roll-over controller. That is, if occurrence of a roll-over is detected, the ignition of the roll-over passive safety device is performed by using the power source device of the roll-over controller as a power source, so that a power source device provided in the airbag controller is not used. Therefore, the airbag controller is able to reliably operate the passive safety devices even in a case where occurrence of an impact is detected following occurrence of a roll-over and in a case where a roll-over is detected following an impact.

BRIEF DESCRIPTION OF THE DRAWINGS

The foregoing and further objects, features and advantages of the present invention will become apparent from the following description of a preferred embodiment with reference to the accompanying drawings, wherein like numerals are used to represent like elements and wherein.

DETAILED DESCRIPTION OF PREFERRED EMBODIMENT

A preferred embodiment of the present invention will be described in detail hereinafter with reference to the accompanying drawings.

Figure 1:
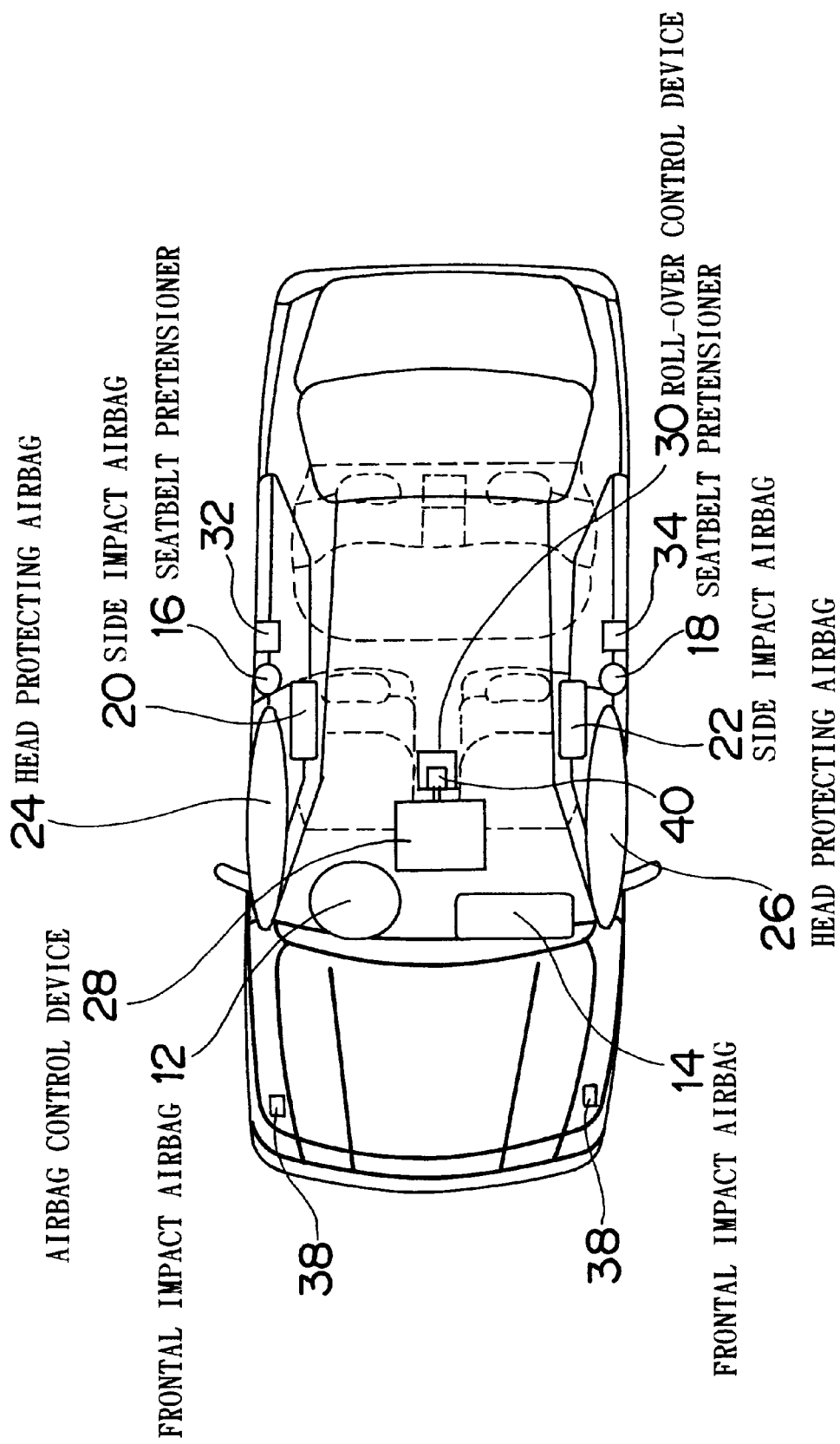
FIG. 1 illustrates an in-vehicle arrangement of an ignition control system according to an embodiment of the invention and a passive safety device controlled by the ignition control system.

FIG. 1 is an in-vehicle arrangement of an ignition control system according to a preferred embodiment of the invention and a passive safety device controlled by the ignition control system. As shown in FIG. 1, the passive safety device includes frontal impact airbags 12, 14 disposed at a driver's seat side (right side in a vehicle) and a passenger's seat side (left side in the vehicle), respectively, seatbelt pretensioners 16, 18 for tightening a driver-side seatbelt and a passenger-side seatbelt, respectively, side impact airbags 20, 22 disposed in a driver-side portion and a passenger-side portion of the vehicle, respectively, and head protecting airbags 24, 26 disposed at the driver's side and the passenger's side. Each head protecting airbag extends along a front pillar and a roof side on the corresponding side.

Figure 2:
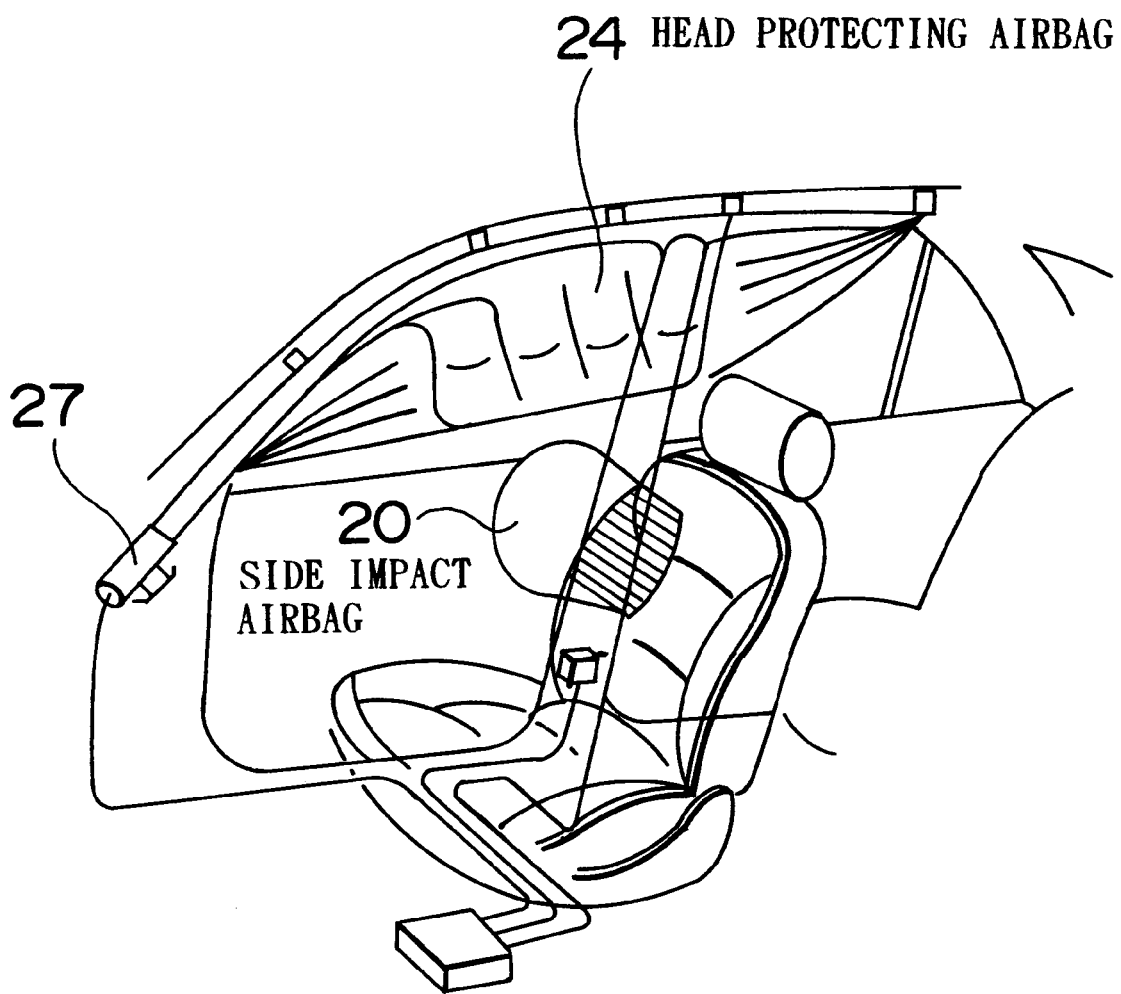
FIG. 2 is a perspective view of a head protecting airbag and a side impact airbag that are provided in the passive safety device, where the airbags are deployed.

FIG. 2 is a perspective view of the driver-side head protecting airbag 24 and a driver-side side impact airbag 20, where the airbags are deployed. The head protecting airbag 24, before being deployed, is housed in a front pillar portion and a roof side portion. Disposed below the front pillar is an inflator 27 for the head protecting airbag 24 (26). The head protecting airbag 24 is deployed along side windows of the vehicle. Therefore, when the vehicle receives a side impact or rolls over, the head protecting airbag 24 (26) prevents an occupant's head from directly contacting a peripheral portion of the front door window.

The ignition control system has an airbag control device 28 and a roll-over control device 30 as shown in FIG. 1. A main body of each of the airbag control unit 28 and the roll-over control device 30 is housed in a front floor center tunnel. The airbag control device 28 has side impact detector units 32, 34 and frontal impact detector units 38. The roll-over control device 30 has a roll-over detector unit 40. The side impact detector units 32, 34 are disposed close to and rearward of the seatbelt pretensioners 16, 18, respectively. The frontal impact detector units 38 are disposed in an engine compartment.

Figure 3:
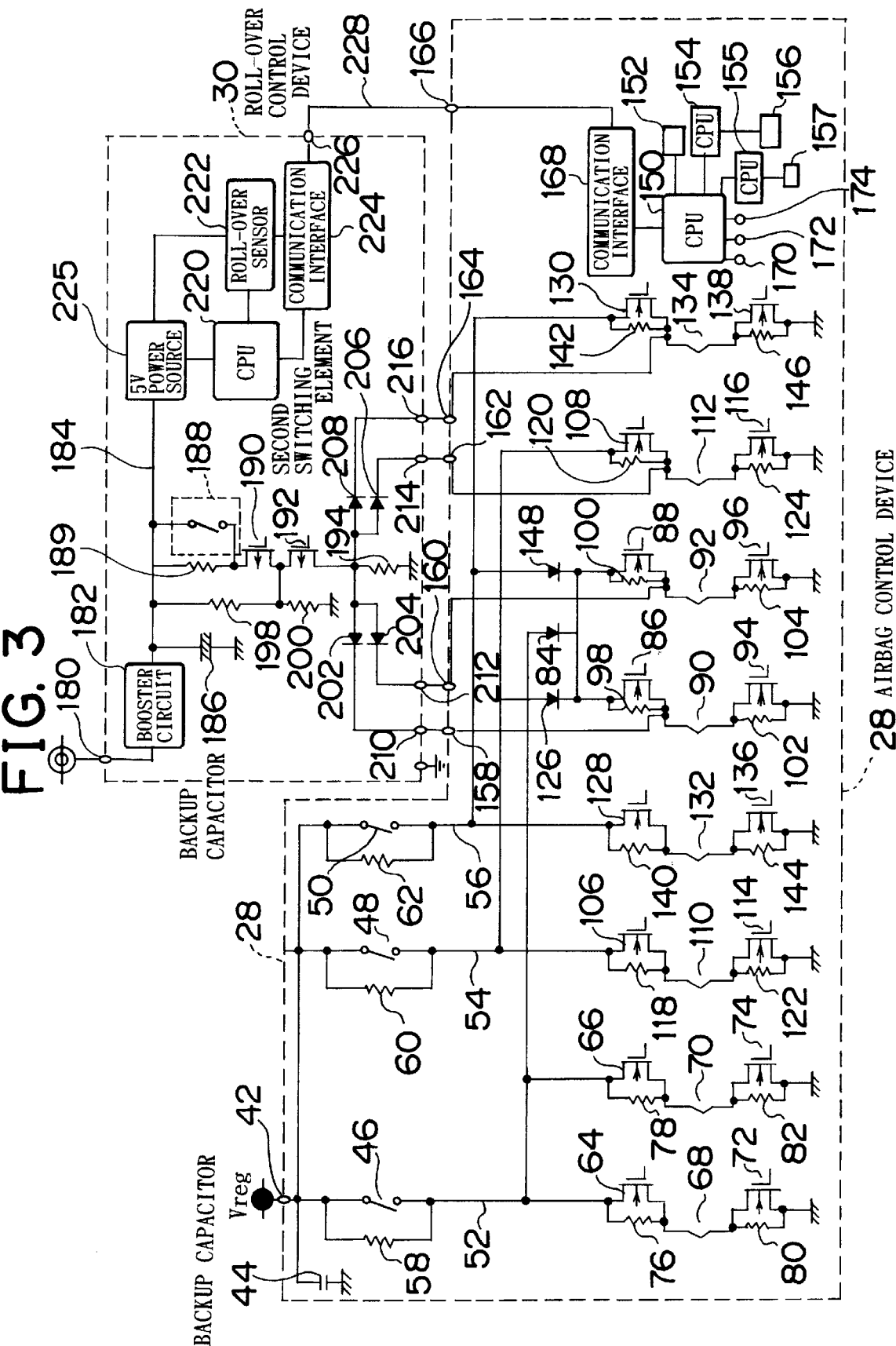
FIG. 3 is a circuit diagram of the ignition control system.

FIG. 3 is a circuit diagram of the airbag control device 28 and the roll-over control device 30 of the ignition control system. The airbag control device 28 will first be described below.

As shown in FIG. 3, the airbag control device 28 has a power source terminal 42 that is supplied with a predetermined source voltage. A backup capacitor 44 is connected to the power source terminal 42. The backup capacitor 44 stores power required for the frontal impact detector unit 38 to operate the passive safety device.

The power source terminal 42 is also connected to a first source line 52, a second source line 54 and a third source line 56 via a front acceleration sensor 46, a right-side acceleration sensor 48 and a left-side acceleration sensor 50, respectively. The front acceleration sensor 46 is a mechanical acceleration sensor that normally remains in an open state and assumes a closed state when an acceleration exceeding a predetermined value occurs in a front-rear direction relative to the vehicle. The right-side acceleration sensor 48 and the left-side acceleration sensor 50 are mechanical acceleration sensors that normally remain in an open state and assumes a closed state when an acceleration exceeding a predetermined value occurs in a sideward direction relative to the vehicle at the driver's side and the passenger's side, respectively. The front acceleration sensor 46, the right-side acceleration sensor 48 and the left-side acceleration sensor 50 are connected to resisters 58, 60 and 62, respectively, in parallel.

The first source line 52 is connected to switching elements 64, 66 that are connected to squibs 68, 70, respectively. The squibs 68, 70, when ignited, deploy the frontal impact airbags 12, 14, respectively. The squibs 68, 70 are connected to ground lines via switching elements 72, 74, respectively. The switching elements 64, 66, 72, 74 are connected to resistors 76, 78, 80, 82, respectively, in parallel.

The first source line 52 is also connected to switching elements 86, 88 via a diode 84. The diode 84 allows current to flow only in the direction from the first source line 52 toward the switching elements 86, 88. The switching elements 86, 88 are connected to squibs 90, 92. When ignited, the squibs 90, 92 operate the seatbelt pretensioners 16, 18, respectively. The squibs 90, 92 are connected to ground lines via switching elements 94, 96. The switching elements 86, 88, 94, 96 are connected to resistors 98, 100, 102, 104, respectively, in parallel.

In the above-described circuit arrangement, when the front acceleration sensor 46 is in the closed state, the squib 68 is ignited if the switching elements 64, 72 become on. Furthermore, when the front acceleration sensor 46 is in the closed state, the squib 70 is ignited if the switching elements 66, 74 become on; the squib 90 is ignited if the switching elements 86, 94 become on, and the squib 92 is ignited if the switching elements 88, 96 become on. The second source line 54 is connected to switching elements 106, 108. The switching elements 106, 108 are connected to squibs 110, 112, respectively. When ignited, the squib 110 deploys the driver-side side impact airbag 20. The squib 112, when ignited, deploys the driver-side head protecting airbag 24. The squibs 110, 112 are connected to ground lines via switching elements 114, 116, respectively. The switching elements 106, 108, 114, 116 are connected to resistors 118, 120, 122, 124, respectively, in parallel.

The second source line 54 is also connected, via a diode 126, to the connecting potion between the diode 84 and the switching elements 86, 88. The diode 126 allows current to flow only in the direction from the second source line 54 toward the switching elements 86, 88.

In the above-described circuit arrangement, when the right-side acceleration sensor 48 is in the closed state, the squib 110 is ignited if the switching elements 106, 114 become on. Furthermore, when the right-side acceleration sensor 48 is in the closed state, the squib 112 is ignited if the switching elements 108, 116 become on; the squib 90 is ignited if the switching elements 86, 94 become on, and the squib 92 is ignited if the switching elements 88, 96 become on.

The third source line 56 is connected to switching elements 128, 130 that are connected to squibs 132, 134, respectively. The squib 132, when ignited, deploys the passenger-side side impact airbag 22. The squib 134, when ignited, deploys the passenger-side head protecting airbag 26. The squibs 132, 134 are connected to ground lines via switching elements 136, 138, respectively. The switching elements 128, 130, 136, 138 are connected to resistors 140, 142, 144, 146, respectively, in parallel.

The third source line 56 is also connected, via a diode 148, to the connecting portion between the diode 84 and the switching elements 86, 88. The diode 148 allows current to flow only in the direction from the third source line 56 toward the switching elements 86, 88.

In the above-described circuit arrangement, when the left-side acceleration sensor 50 is in the closed state, the squib 132 is ignited if the switching elements 128, 136 become on. Furthermore, when the left-side acceleration sensor 50 is in the closed state, the squib 134 is ignited if the switching elements 130, 138 become on; the squib 90 is ignited if the switching elements 86, 94 become on, and the squib 92 is ignited if the switching elements 88, 96 become on.

The provision of the diodes 126, 148 prevents source voltage from being supplied to the second source line 54 and the third source line 56 when the front acceleration sensor 46 is in the closed state while the right-side acceleration sensor 48 and the left-side acceleration sensor 50 are in the open state. Similarly, the provision of the diode 84 prevents source voltage from being supplied to the first source line 52 when the right-side acceleration sensor 48 or the left-side acceleration sensor 50 is in the closed state while the front acceleration sensor 46 is in the open state.

The airbag control device 28 has a CPU 150 that controls the on-off operation of all the aforementioned switching elements. A front-rear acceleration sensor 152 is connected to the CPU 150. The front-rear acceleration sensor 152 detects deceleration in the front-rear directions relative to the vehicle. Based on the deceleration in the front-rear directions detected by the front-rear acceleration sensor 152, the CPU 150 detects occurrence of a frontal impact. Upon detection of a frontal impact, the CPU 150 turns on the switching elements 64, 66, 72, 74 to ignite the squibs 68, 70, and turns on the switching elements 86, 88, 94, 96 to ignite the squibs 90, 92.

The front acceleration sensor 46 is designed to assume the closed state at a deceleration that is less than a deceleration for which the CPU 150 detects occurrence of a frontal impact. Therefore, when the CPU 150 properly detects occurrence of a frontal impact, the front acceleration sensor 46 has assumed the closed state. In this case, the switching elements 64, 66, 72, 74 and the switching elements 86, 88, 94, 96 are turned on to ignite the squibs 68, 70 and the squibs 90, 92, so that the frontal impact airbags 12, 14 are deployed and the seatbelt pretensioners 16, 18 are operated. However, if the CPU 150 falsely detects a frontal impact due to an electrical noise or the like when no frontal impact has occurred, the front acceleration sensor 46 remains in the open state. Therefore, the squibs 68, 70, 90, 92 are not ignited even though the switching elements 64, 66, 72, 74 and the switching elements 86, 88, 94, 96 are turned on.

In the above-described circuit arrangement, the squibs 68, 70, 90, 92 are ignited only when the front acceleration sensor 46 assumes the closed state and the corresponding switching elements are turned on. Therefore, the malfunction of the passive safety device caused by an electric noise or the like is prevented.

The front-rear acceleration sensor 152 and the front acceleration sensor 46 are contained in the airbag control device 28. The above-described circuit provided for supplying ignition current from the power source terminal 42 to the squibs will be hereinafter referred as "ignition circuit of the airbag control device 28".

Side impact detecting CPUs 154, 155 are connected to the CPU 150. The side impact detecting CPUs 154, 155 are connected to side acceleration sensors 156, 157, respectively. The side acceleration sensors 156, 157 detect acceleration occurring in sideways directions relative to the vehicle at the driver's side and the passenger's side, respectively. Based on detection signals from the side acceleration sensors 156, 157, the side impact detecting CPUs 154, 155 detect occurrence of a side impact on the driver's side and the passenger's side, respectively. Upon detection of a side impact, the side impact detecting CPU 154 (155) outputs a signal indicating the detection, to the CPU 150. The side impact detecting CPU 154, the side acceleration sensor 156 and the right-side acceleration sensor 48 constitute the aforementioned side impact detector unit 32. The side impact detecting CPU 155, the side acceleration sensor 157 and the left-side acceleration sensor 50 constitute the side impact detector unit 34.

Upon receiving from the side impact detecting CPU 154 a signal indicating that a side impact has occurred on the driver's side, the CPU 150 turns on the switching elements 106, 114 to ignite the squib 110, and turns on the switching elements 108, 116 to ignite the squib 112, and turns on the switching elements 86, 88, 94, 96 to ignite the squibs 90, 92.

The right-side acceleration sensor 48 is designed to assume the closed state at an acceleration that is less than an acceleration for which the side impact detecting CPU 154 detects occurrence of a side impact on the driver's side. Therefore, when the side impact detecting CPU 154 properly detects occurrence of a side impact on the driver's side, the right-side acceleration sensor 48 has assumed the closed state. In this case, the switching elements 106, 114, the switching elements 108, 116 and the switching elements 86, 88, 94, 96 are turned on to ignite the squibs 110, 112, 90, 92, so that the driver-side side impact airbag 20 and the driver-side head protecting airbag 24 are deployed and the seatbelt pretensioners 16, 18 are operated.

However, if the side impact detecting CPU 154 falsely detects a side impact due to an electrical noise or the like when no side impact has occurred, the right-side acceleration sensor 48 remains in the open state. Therefore, the squibs 110, 112, 90, 92 are not ignited even though the switching elements 106, 114, the switching elements 108, 116 and the switching elements 86, 88, 94, 96 are turned on. Thus, in the above-described circuit arrangement, the squibs 110, 112, 90, 92 are ignited only when the right-side acceleration sensor 48 assumes the closed state and the corresponding switching elements are turned on. Therefore, the malfunction of the passive safety device caused by an electric noise or the like is prevented.

Likewise, upon receiving from the side impact detecting CPU 155 a signal indicating that a side impact has occurred on the passenger's side, the CPU 150 turns on the switching elements 128, 136 to ignite the squib 132, and turns on the switching elements 130, 138 to ignite the squib 134, and turns on the switching elements 86, 88, 94, 96 to ignite the squibs 90, 92. The left-side acceleration sensor 50 is designed to assume the closed state at an acceleration that is less than an acceleration for which the side impact detecting CPU 155 detects occurrence of a side impact on the passenger's side. Therefore, the malfunction of the passive safety device caused by false detection of a side impact made by the left-side acceleration sensor 50 is prevented. That is, the passenger-side side impact airbag 22 and the passenger-side head protecting airbag 26 are deployed and the seatbelt pretensioners 18, 18 are operated, only when a side impact actually occurs on the passenger's side.

The airbag control device 28 has external terminals 158, 160, 162, 164. The external terminals 158, 160, 162, 164 are connected to the connecting portion between the switching element 86 and the squib 90, the connecting portion between the switching element 88 and the squib 92, the connecting portion between the switching element 108 and the squib 112, and the connecting portion between the switching element 130 and the squib 134, respectively. The airbag control device 28 further has a communication terminal 166 that is connected to the CPU 150 via a communication interface 168.

The CPU 150 is also connected to a frontal impact alarm lamp 170, a side impact alarm lamp 172, and a roll-over alarm lamp 174. The frontal impact alarm lamp 170, the side impact alarm lamp 172 and the roll-over alarm lamp 174 are turned on if an abnormality is detected in a component part of the ignition system related to a frontal impact, a side impact and a roll-over, respectively.

The roll-over control device 30 will next be described. As shown in FIG. 3, the roll-over control device 30 has a power source terminal 180. The power source terminal 180 is supplied with a predetermined source voltage. The power source terminal 180 is connected to a source line 184 via a booster circuit 182. A backup capacitor 186 is connected to the source line 184. The backup capacitor 186 stores power required to operate the roll-over control device 30.

A roll-over acceleration sensor 188 is connected to the source line 184. The roll-over acceleration sensor 188 is a mechanical angle sensor that normally remains in an open state and assumes a closed state when the vehicle undergoes a roll angle exceeding a predetermined value. The roll-over acceleration sensor 188 is connected to a resistor 189 in parallel. Connected in series between the roll-over acceleration sensor 188 and a ground line are a first switching element 190, a second switching element 192 and a resistor 194 in that order starting at the side of the roll-over acceleration sensor 188. A resistor 198 and another resistor 200 are connected in series between the source line 184 and a ground line, in that order starting at the side of the source line 184. The connecting portion between the first switching element 190 and the second switching element 192 and the connecting portion between the resistors 198 and 200 are interconnected.

The circuit formed by the switching elements, the resistors, the acceleration sensor and the like that are disposed between the source line 184 and the ground line will be hereinafter referred to as "ignition circuit of the roll-over control device 30".

The connecting portion between the second switching element 192 and the resistor 194 is connected to external terminals 210, 212, 214, 216 via diodes 202, 204, 206, 208, respectively. The diodes 202, 204, 206, 208 allow current to flow only in the direction from the second switching element 192 toward the external terminals 210, 212, 214, 216.

In the above-described arrangement, if the first switching element 190 and the second switching element 192 are turned on under a condition that the roll-over acceleration sensor 188 is in the closed state, the source voltage is supplied from the source line 184 to the external terminals 210, 212, 214, 216.

The roll-over control device 30 has a CPU 220 that controls the on-off operation of the first and second switching elements 190, 192. The CPU 220 is connected to a roll-over sensor 222 and a communication interface 224. The communication interface 224 is connected to a communication terminal 226. A constant voltage source 225 is connected to the CPU 220 and the roll-over sensor 222. The constant voltage source 225 converts the source voltage of the source line 184 into a predetermined voltage, and supplies it to the CPU 220 and the roll-over sensor 222.

The roll-over sensor 222 is an angle sensor for detecting a roll angle that occurs to the vehicle. An output signal of the roll-over sensor 222 is supplied to the CPU 220. Based on the output signal from the roll-over sensor 222, the CPU 220 detects occurrence of a roll-over of the vehicle and the direction of the roll-over (rightward or leftward). The roll-over acceleration sensor 188 and the roll-over sensor 222 constitute the roll-over detector unit 40, and are contained in the roll-over control device 30.

The external terminals 210, 212, 214, 216 of the roll-over control device 30 are connected to the external terminals 158, 160, 162, 164 of the airbag control device 28, respectively. The communication terminal 226 of the roll-over control device 30 is connected to the communication terminal 166 of the airbag control device 28 by a communication line 228. Therefore, the CPU 150 of the airbag control device 28 and the CPU 220 of the roll-over control device 30 can communicate with each other, via the communication interface 168, the communication line 228 and the communication interface 224.

Upon detecting occurrence of a roll-over based on the output signal from the roll-over sensor 222, the CPU 220 turns on the first and second switching elements 190, 192, and transmits a signal indicating the occurrence of a roll-over and the roll-over direction (hereinafter, referred to as "roll-over occurrence signal") to the airbag control device 28, via the communication interface 224 and the communication terminal 226.

The roll-over acceleration sensor 188 is designed to assume the closed state at a roll angle that is less than a roll angle for which the CPU 220 detects occurrence of a roll-over. Therefore, when the CPU 220 properly detects occurrence of a roll-over, the roll-over acceleration sensor 188 has assumed the closed state. In this case, the first and second switching elements 190, 192 are turned on, so that the source voltage of the source line 184 is supplied toward the external terminals 210, 212, 214, 216. However, if the CPU 220 makes falsely detects occurrence of a roll-over due to an electric noise or the like, the roll-over acceleration sensor 188 remains in the open state, so that the source voltage of the source line 184 is not supplied toward the external terminals 210, 212, 214, 216 even through the first and second switching elements 190, 192 are turned on.

Upon receiving the roll-over occurrence signal from the roll-over control device 30, the CPU 150 of the airbag control device 28 turns on the switching elements 94, 96 to ignite the squibs 90, 92 so as to operate the seatbelt pretensioners 16, 18. Simultaneously, the CPU 150 turns on the switching element 116 or 138 to ignite the squib 112 or 134 in accordance with the roll-over direction. That is, if the roll-over is in the rightward direction (that is, such a roll-over direction that the driver's side becomes lower), the CPU 150 operates to ignite the squib 112 so as to deploy the driver-side head protecting airbag 24. Conversely, if the roll-over is in the leftward direction (that is, such a roll-over direction that the passenger's side becomes lower), the CPU 150 operates to ignite the squib 134 so as to deploy the passenger-side head protecting airbag 26. Although in the foregoing description, the seatbelt pretensioners 16, 18 are operated at the same timing as the head protecting airbags 24, 26, it is also possible to operate the seatbelt pretensioners 16, 18 prior to the head protecting airbags 24, 26.

If the CPU 220 properly detects occurrence of a roll-over, the source voltage of the source line 184 is supplied to the external terminals 210, 212, 214, 216, and then supplied therefrom to the squibs 90, 92, 112, 134 via the external terminals 158, 160, 162, 164, respectively, of the airbag control device 28. The switching elements 94, 96 are turned on, so that the squibs 90, 92 are ignited. Simultaneously, the switching element 116 or 138 is turned on, so that the squib 112 or 134 is ignited. However, if the CPU 220 falsely detects occurrence of a roll-over, the source voltage is not supplied to the external terminals 210, 212, 214, 216, so that the corresponding squibs are not ignited even through the switching elements 94, 96 and the switching element 116 or 138 are turned on. Therefore, the malfunction of the passive safety device is prevented.

If the squib 90, as for example, is ignited in the airbag control device 28, the source voltage of the first source line 52 is supplied to the external terminal 158 via the switching element 86, and then supplied therefrom to the external terminal 210 of the roll-over control device 30. In this embodiment, however, the source voltage supplied to the external terminal 210 is prevented from being supplied further to the ignition circuit of the roll-over control device 30 in the reverse direction, by the diode 202 provided between the external terminal 210 and the ignition circuit. Likewise, if any one of the squibs 92, 112, 134 is ignited, the source voltage is supplied to the corresponding external terminal 212, 214 or 216 of the roll-over control device 30 from the corresponding external terminal 160, 162, 164 of the airbag control device 28, but the voltage is prevented from being supplied therefrom further to the ignition circuit of the roll-over control device 30 in the reverse direction, by the corresponding one of the diodes 204, 206, 208.

Based on the roll-over occurrence signal from the roll-over control device 30, the airbag control device 28 turns on the corresponding switching elements as described above. Therefore, this embodiment eliminates the need to provide signal lines via which the roll-over control device 30 outputs on/off instructions to the corresponding switching elements provided in the airbag control device 28. Thus, the ignition control system of this embodiment reduces the number of component parts required for wiring, for example, the number of connectors or the like.

Depending on the conditions of a vehicle crash, there may occur a case where a frontal impact or a side impact occurs at the elapse of a length of time following a roll-over of the vehicle. In such a case, there is a possibility that the ignition of the squibs corresponding to the occurrence of the roll-over will consume the amount of power stored in the backup capacitor 44 provided in the airbag control device 28 and, therefore, the following ignition of the squibs corresponding to the frontal or side impact will not be sufficiently performed, if the squibs corresponding to occurrence of a roll-over and the squibs corresponding to occurrence of a frontal or side impact are ignited by using the backup capacitor 44 as a common power source.

However, the ignition system of this embodiment is designed so that the squibs corresponding to the head protecting airbags 24, 26 are ignited by using the source line 184 (that is, the backup capacitor 186) of the roll-over control device 30 as a power source. Therefore, at the time of occurrence of a roll-over, the power stored in the backup capacitor 44 of the airbag control device 28 is not consumed, so that if a frontal or side impact follows the roll-over, the squibs 68, 70 or the squibs 110, 132 can be reliably ignited by using the backup capacitor 44 as a power source to deploy the frontal impact airbags 12, 14 or the side impact airbag 20, 22 without a fail. Furthermore, if a frontal impact is followed by a roll-over, the power stored in the backup capacitor 186 of the roll-over control device 30 is not consumed at the time of the frontal impact, so that the head protecting airbags 24, 26 can be reliably deployed by using the backup capacitor 186 at the time of the roll-over.

Although in the foregoing embodiment, the driver-side head protecting airbag 24 or the passenger-side head protecting airbag 26 is deployed depending on the roll-over direction, it is also possible to adopt a construction that is also capable of coping with a roll-over exceeding half a rotation or a roll-over angle of 180°. In an example of such a construction, when a rightward roll-over, as for example, is detected, the driver-side head protecting airbag 24 is deployed, and if the rightward roll-over exceeds a predetermined roll-over angle (for example, 180°), the passenger-side head protecting airbag 26 is deployed. Furthermore, if a sufficient deploying pressure for the head protecting airbags 24, 26 can be maintained for a sufficient length of time, both the head protecting airbags 24, 26 may be deployed when a roll-over in either direction is detected.

In the ignition system of the embodiment, two types of abnormality diagnostics (primary diagnostic and regular diagnostic) are performed in order to determine whether there is an abnormality in the system. The primary diagnostic is performed immediately after an ignition switch of the vehicle is turned on. The regular diagnostic is performed periodically when the vehicle is in normal operation.

To start the primary diagnostic, the CPU 220 of the roll-over control device 30 turns off the second switching element 192. The primary diagnostic in the roll-over control device 30 is performed mainly under a condition that the second switching element 192 is off.

During the primary diagnostic in the airbag control device 28, diagnostic is performed with respect to the front-rear acceleration sensor 152, the side acceleration sensors 156, 157, the front acceleration sensor 46, the right-side acceleration sensor 48, the left-side acceleration sensor 50, the switching elements, the squibs, the backup capacitor 44, the ROM and RAM provided in the CPU 150, and the like.

The diagnostic of the front-rear acceleration sensor 152 is performed by the CPU 150 supplying a predetermined test signal to a diagnostic terminal of the front-rear acceleration sensor 152 and detecting whether the front-rear acceleration sensor 152 outputs a predetermined signal in response to the test signal. Similarly, the diagnostic of the side acceleration sensors 156, 157 is performed by the CPU 150 supplying a predetermined test signal to diagnostic terminals provided in the side acceleration sensors 156, 157.

In the diagnostic with respect to the front acceleration sensor 46, it is determined whether there is a closing failure. The diagnostic is performed by detecting an electric potential (test potential) of a first source line(52)-side terminal of the front acceleration sensor 46 under a condition that all the switching elements are off. If the open state of the front acceleration sensor 46 is maintained, the test potential of the front acceleration sensor 46 becomes a value obtained by dividing the source voltage supplied to the power source terminal 42 corresponding to the resistance of the resistor 58 and the combined resistance of the resistors disposed between the first source line 52 and the ground line.

However, if a closing failure occurs in the front acceleration sensor 46, substantially no voltage fall is caused by the resistor 58, so that the test potential becomes substantially equal to the source voltage. Therefore, the closing failure of the front acceleration sensor 46 can be detected by determining a magnitude relationship between the test potential and a predetermined threshold. Similarly, with respect to the right-side acceleration sensor 48 and the left-side acceleration sensor 50, such a closing failure can be detected by determining a magnitude relationship between the potential of a terminal thereof on the side of the second source line 54 or the third source line 56 and a predetermined threshold.

Similar to the diagnostic of the front acceleration sensor 46, the diagnostic of the switching elements can be performed on the basis of a change in the terminal potential caused by the on-off state change. For example, the diagnostic of the switching element 64 is performed by detecting a potential (test potential) of a squib(68)-side terminal of the switching element 64 under a condition that the switching element 72 is off. If the switching element 64 is off, the test potential becomes a value obtained by dividing the potential of the first source line 52 corresponding to the resistor 76 and the resistor 80. Conversely, if the switching element 64 is on, the test potential becomes substantially equal to the potential of the first source line 52. Therefore, the CPU 150 can determine whether the switching element 64 has an abnormality, by detecting test potentials while giving the on-instruction to the switching element 64 and while giving the off-instruction thereto, and comparing the detected values with predetermined thresholds.

Likewise, the diagnostic of the switching element 72 is performed by detecting a potential (test potential) of a squib(68)-side terminal of the switching element 72 under a condition that the switching element 64 is off. If the switching element 72 is off, the test potential becomes a value obtained by dividing the potential of the first source line 52 corresponding to the resistor 76 and the resistor 80. Conversely, if the switching element 72 is on, the test potential becomes substantially equal to the ground potential. Therefore, the CPU 150 can determine whether the switching element 72 has an abnormality, by detecting test potentials while giving the on-instruction to the switching element 72 and while giving the off-instruction thereto, and comparing the detected values with predetermined thresholds.

The diagnostic of the squibs is performed as follows. The airbag control device 28 has a current supply circuit (not shown) for supplying a predetermined current to each squib. The CPU 150 determines whether the correct resistance of each squib is maintained, that is, whether there is an abnormality such as a break, a short circuit or the like, by detecting a voltage between the terminals of each squib and determining whether the voltage between the terminals matches the value of current supplied from the current supply circuit to the squib.

Upon detecting an abnormality in a component part by the primary diagnostic, the CPU 150 of the airbag control device 28 turns on the frontal impact alarm lamp 170 or the side impact alarm lamp 172 in accordance with whether the component part is related to a frontal impact or a side impact. After completing the primary diagnostic, the CPU 150 transmits a signal indicating the completion thereof (hereinafter, referred to as "primary diagnostic completion signal") to the CPU 220 of the roll-over control device 30. According to the protocol employed for communication between the communication interfaces 168, 224, the communication interface 224 of the roll-over control device 30 does not send a reception confirmation signal back to the communication interface 168 after the CPU 150 of the airbag control device 28 has sent a signal to the CPU 220. Therefore, the communication interface 168 of the airbag control device 28 does not wait for a reception confirmation signal from the communication interface 224 of the roll-over control device 30, after completion of the transmission of the primary diagnostic completion signal to the communication interface 224.

The primary diagnostic in the roll-over control device 30 is performed mainly under a condition that the second switching element 192 is off, substantially in parallel in time to the primary diagnostic in the airbag control device 28. During the primary diagnostic in the roll-over control device 30, diagnostic is performed with respect to the roll-over sensor 222, the roll-over acceleration sensor 188, the first switching element 190, the second switching element 192, the backup capacitor 186, the ROM and the RAM provided in the CPU 220, and the like.

The diagnostic of the roll-over sensor 222 is performed by the CPU 220 supplying a predetermined test signal to a diagnostic terminal provided in the roll-over sensor 222, similarly to the diagnostic of the front-rear acceleration sensor 152.

The diagnostic of the roll-over acceleration sensor 188 determines whether there is a closing failure, similarly to the diagnostic of the front acceleration sensor 46. The diagnostic of the roll-over acceleration sensor 188 is performed by detecting a potential (test potential) of a first switching element(190)-side terminal of the roll-over acceleration sensor 188 under a condition that the on-state of the first switching element 190 is maintained. If the roll-over acceleration sensor 188 remains in the open state, the test potential of the roll-over acceleration sensor 188 becomes a value obtained by dividing the source voltage corresponding to the combined resistance of the resistors 189, 190 connected in parallel and the resistance of the resistor 200. However, if a closing failure occurs in the roll-over acceleration sensor 188, substantially no voltage fall is caused by the resistor 189, so that the test potential becomes substantially equal to the potential of the source line 184. Therefore, the closing failure of the roll-over acceleration sensor 188 can be detected by determining a magnitude relationship between the test potential of the roll-over acceleration sensor 188 and a predetermined threshold.

The diagnostic of the first switching element 190 is performed on the basis of the potential (test potential) of a second switching element(192)-side terminal of the first switching element 190. If the first switching element 190 is on, the test potential becomes a value obtained by dividing the potential of the source line 184 corresponding to the resistor 189 and the resistor 200. Conversely, if the first switching element 190 is off, the test potential becomes a value obtained by dividing the potential of the source line 184 corresponding to the resistor 198 and the resistor 200. The resistance of the resistor 189 and the resistance of the resistor 198 are set different from each other. Therefore, the test potential varies in accordance with whether the first switching element 190 is on or off. Consequently, the CPU 220 can determine whether the first switching element 190 has an abnormality, by detecting test potentials while giving the on-instruction to the first switching element 190 and while giving the off-instruction thereto, and comparing the detected values in magnitude with predetermined thresholds.

The CPU 220 performs the diagnostic of the second switching element 192 after completing the diagnostic of all the component parts other than the second switching element 192 and receiving the primary diagnostic completion signal from the airbag control device 28. The diagnostic of the second switching element 192 is performed by detecting a potential (test potential) of a resister(194)-side terminal of the second switching element 192 under a condition that the off-state of the first switching element 190 is maintained. If the second switching element 192 is off, the test potential becomes substantially equal to the ground potential. Conversely, if the second switching element 192 is on, the test potential becomes a value obtained by dividing the potential of the source line 184 corresponding to the resistance of the resistance of the resistor 198 and the combined resistance of the resistors 194, 200 connected in parallel. Therefore, the CPU 220 can determine whether the second switching element 192 has an abnormality, by detecting test potentials while giving the on-instruction to the second switching element 192 and while giving the off-instruction thereto, and comparing the detected values in magnitude with predetermined thresholds. If the CPU 220 detects an abnormality in a component part by the primary diagnostic, the CPU 220 transmits a signal indicating the detection (hereinafter, referred to as "roll-over-system abnormality signal") to the CPU 150 of the airbag control device 28. Upon receiving the roll-over-system abnormality signal, the CPU 150 turns on the roll-over alarm lamp 174. If the CPU 150 receives no such signal from the roll-over control device 30, the CPU 150 determines that no abnormality was detected in the roll-over control device 30 by the primary diagnostic.

The regular diagnostic will next be described. The regular diagnostic in the airbag control device 28 checks for an abnormality that the output signal of the front-rear acceleration sensor 152 or the output signal of the side acceleration sensors 156, 157 becomes fixed to a maximum value or a minimum value (fixed signal abnormality), and a break or short-circuit abnormality in each squib. Upon detecting an abnormality in a component part by the regular diagnostic, the CPU 150 of the airbag control device 28 turns on the frontal impact alarm lamp 170 or the side impact alarm lamp 172 in accordance with whether the component part is related to a frontal impact or a side impact.

The regular diagnostic in the roll-over control device 30 checks for a fixed signal abnormality in the roll-over sensor 222, a voltage abnormality in the backup capacitor 186, and the like. Upon detecting an abnormality in a component part by the regular diagnostic, the CPU 220 of the roll-over control device 30 transmits the roll-over-system abnormality signal to the airbag control device 28. Upon receiving the roll-over-system abnormality signal, the CPU 150 of the airbag control device 28 turns on the roll-over alarm lamp 174. If the CPU 150 receives no such signal from the roll-over control device 30, the CPU 150 determines that no abnormality was detected in the roll-over control device 30 by the regular diagnostic.

The head protecting airbags 24, 26, that is, passive safety devices, are deployed not only at the time of a roll-over but also at the time of a side impact, so as to protect an occupant's head, as described above. Therefore, it is also possible to equip a vehicle with an ignition control system in which the roll-over detecting function is omitted, and the head protecting airbags 24, 26 are operated only at the time of a side impact. In such an ignition control system, therefore, the roll-over control device 30 is omitted. If the operation of the airbag control device 28 is affected by whether the roll-over control device 30 is provided or not, it becomes necessary to adjust the airbag control device 28 in accordance with the vehicle specifications related to the ignition control system. As a result, there may arise problems of lacking general versatility of the system and cost increase. Therefore, it is desirable to design the airbag control device 28 so as to operate without being affected by whether the roll-over control device 30 is provided or not.

According to this embodiment, the protocol of communication between the airbag control device 28 and the roll-over control device 30 is set so that the communication interface 224 of the roll-over control device 30 does not send any signal back to the communication interface 168 of the airbag control device 28 after the airbag control device 28 has sent a signal to the roll-over control device 30. Therefore, the operation of the airbag control device 28 following the output of the primary diagnostic completion signal from the CPU 150 of the airbag control device 28 is not affected by whether the roll-over control device 30 is provided or not.

Only if the CPU 150 receives the roll-over-system abnormality signal, the CPU 150 of the airbag control device 28 determines that an abnormality has occurred in the roll-over control device 30, and turns on the roll-over alarm lamp 174, as described above. Therefore, if the roll-over control device 30 is omitted, the CPU 150 does not receive the roll-over-system abnormality signal, so that the CPU 150 performs no particular operation. That is, the operation of the airbag control device 28 is not affected by whether the roll-over control device 30 is provided or not. Furthermore, when a roll-over occurs, the CPU 220 of the roll-over control device 30 transmits the roll-over occurrence signal to the CPU 150 of the airbag control device 28. The CPU 150 determines that no roll-over has occurred, unless the CPU 150 receives the roll-over occurrence signal. Therefore, if the roll-over control device 30 is omitted and the roll-over occurrence signal is not generated, the operation of the airbag control device 28 is not adversely affected.

Thus, the protocol or specification of the communication between the airbag control device 28 and the roll-over control device 30 is set so that the airbag control device 28 is not adversely affected by whether the roll-over control device 30 is provided or not. Therefore, the system of this embodiment is able to operate normally, without being adversely affected by whether the roll-over control device 30 is provided or not.

Furthermore, the ignition control system of this embodiment performs the squib ignition for a roll-over by using the backup capacitor 186 of the roll-over control device 30 as a power source, in order to reliably operate predetermined passive safety devices if a roll-over is followed by a frontal or side impact or if a frontal impact is followed by a roll-over, as described above. However, in a construction in which the ignition circuit of the airbag control device 28 and the ignition circuit of the roll-over control device 30 are electrically interconnected during the primary diagnostic or the regular diagnostic, it is necessary to adjust the circuit constants or factors of the airbag control device 28 related to the diagnostic (for example, the resistance of each resistors, diagnostic thresholds, and the like), in accordance with whether the roll-over control device 30 is provided or not.

For example, if the source line 184 of the roll-over control device 30 is connected to the external terminal 159 of the airbag control device 28 during the primary diagnostic, current flows from the source line 184, via the external terminal 158, into the ignition circuit of the airbag control device 28, so that the potential of the squib(90)-side terminal of the switching element 86 (that is, the test potential of the switching element 86) changes. Therefore, in order to properly perform the diagnostic of the switching element 86, it becomes necessary to adjust the thresholds for comparison with the detected test potentials or the resistance of the resistor 198 in accordance with the roll-over control device 30 is provided or not. Furthermore, a change in the aforementioned test potential also affects the impedance of the first source line 52, the second source line 54 and the third source line 56 relative to the ground line, via the resistor 98 and the diodes 84, 126, 148, respectively. Therefore, it becomes necessary to re-adjust the diagnostic thresholds or the resistance of each resistor with regard to all the switching elements connected to the source lines, in accordance with the roll-over control device 30 is provided or not.

In contrast, in the system of the embodiment, the primary diagnostic in the airbag control device 28 is performed under the condition that the second switching element 192 of the roll-over control device 30 is off. If the second switching element 192 is off, the ignition circuit of the roll-over control device 30 is electrically disconnected from the ignition circuit of the airbag control device 28. Therefore, during the primary diagnostic in the airbag control device 28, the potentials of the various sites in the ignition circuit of the airbag control device 28 do not change depending on whether the roll-over control device 30 is provided. Furthermore, during normal operation, the first switching element 190 and the second switching element 192 remain off. Therefore, during the regular diagnostic as well, the potentials of the various sites in the ignition circuit of the airbag control device 28 do not change depending on whether the roll-over control device 30 is provided. Thus, the ignition control system of this embodiment eliminates the need to adjust the circuit constants or factors of the airbag control device 28 in accordance with the roll-over control device 30 is provided.

Thus, the ignition control system of the embodiment is designed so as to normally operate without being adversely affected by whether the roll-over control device 30 is provided, while ensuring correct operation of the passive safety devices by supplying power thereto from the roll-over control device 30 at the time of a roll-over, even if the roll-over is followed by a frontal or side impact or if the roll-over precedes a frontal impact. Therefore, the ignition control system of the invention allows the use or application of the airbag control device 28 having fixed circuit constants or factors, regardless of whether the roll-over control device 30 is provided. As a result, the general versatility of the airbag control device 28 improves, and the cost thereof can be reduced. Furthermore, the general versatility of the roll-over control device 30 is also improved since the electrical interference between the roll-over control device 30 and the airbag control device 28 is minimized. Therefore, it becomes possible to combine the roll-over control device 30 with various airbag control devices that vary in, for example, the number of airbags, and the like, without a need to considerably change the specifications or design of the device. The cost of the roll-over control device 30 can also be reduced.

Furthermore, in the embodiment, the primary diagnostic in the airbag control device 28 and the primary diagnostic in the roll-over control device 30 are performed in parallel in time, except for the diagnosis of the second switching element 192 of the roll-over control device 30. Therefore, the ignition control system of the embodiment reduces the time required for the primary diagnostic and makes it possible to complete the primary check (primary diagnostic) within a short period of time after the ignition switch of the vehicle is turned on.

The ignition control system of the embodiment combines the airbag control device 28 with the roll-over control device 30, which detects occurrence of a roll-over, and the system is designed to deploy the head protecting airbags 24, 26 at the time of occurrence of a roll-over, as described above. However, the invention is not limited to the foregoing embodiment, but may be modified in various manners. For example, the invention is also applicable to an ignition control system that combines the airbag control device 28 with a control device for detecting a spinning state of the vehicle and operates only the seatbelt pretensioners at the time of occurrence of a spinning state of the vehicle.

Furthermore, in the foregoing embodiment, power is supplied from the roll-over control device 30 at the time of a roll-over. It is also possible to improve the general versatility of the roll-over control device 30 in a construction in which power is supplied from the airbag control device 28 in all occasions including a roll-over, by designing the interface for communication between the two control devices so that the operation of the airbag control device 28 is not affected by whether the roll-over control device 30 is provided as described above.

While the present invention has been described with reference to what is presently considered to be a preferred embodiment thereof, it is to be understood that the invention is not limited to the disclosed embodiment or constructions. To the contrary, the invention is intended to cover various modifications and equivalent arrangements.

What is claimed is:

1. An ignition control system for a vehicular passive safety system comprising:
   a first controller that controls a first passive safety device on the basis of a first dangerous state of a vehicle;
   a second controller that controls, on the basis of a second dangerous state of the vehicle, a second passive safety device incorporating at least a portion of the first passive safety device; and
   a communication interface enabling communication between the first controller and the second controller,
   wherein a communication specification of the communication interface is set such that control by the first controller is the same when the second controller is provided as it would be if the second controller were not provided.

2. An ignition control system for a passive safety system, comprising:
   an airbag control device that controls an operation of an impact passive safety device including at least an impact airbag, a seatbelt pretensioner and a head protecting airbag, on the basis of an impact condition occurring to a vehicle;
   a roll-over controller that controls, on the basis of a roll-over occurring to the vehicle, an operation of a roll-over passive safety device incorporating at least the head protecting airbag of the impact passive safety device; and
   a communication interface enabling communication between the airbag controller and the roll-over controller,
   wherein a communication specification of the communication interface is set such that control by the airbag controller is the same when the roll-over controller is provided as it would be if the roll-over controller were not provided.

3. An ignition control system according to claim 2, wherein the roll-over control device comprises:
   a power source;
   a roll-over power source supply passage that supplies power from the power source to the airbag controller; and
   a switch that switches the roll-over power supply passage between a connected state and a disconnected state, wherein the airbag controller performs a diagnostic of the ignition control system when the roll-over power supply passage is disconnected by the switch.

4. An ignition control system according to claim 3, wherein the airbag controller performs an early diagnostic with respect to the ignition control system immediately after an ignition switch of the vehicle is turned on, and the airbag controller transmits a diagnostic completion signal to the roll-over controller after performing the early diagnostic, and
   wherein the roll-over controller performs an early diagnostic with respect to a component part other than the switch, in parallel with the early diagnostic performed by the airbag controller, and performs the early diagnostic with respect to the switch after receiving the diagnostic completion signal from the airbag controller.

5. An ignition control system according to claim 3,
   wherein upon detecting occurrence of a roll-over of the vehicle, the roll-over controller connects the roll-over power supply passage by using the switch, and transmits a roll-over occurrence signal to the airbag controller, and
   wherein upon receiving the roll-over occurrence signal, the airbag controller supplies an ignition current to the roll-over passive safety device by using power supplied from the roll-over controller.

6. An ignition control system according to claim 3, wherein the diagnostic performed by the airbag controller device determines whether there is an abnormality on the basis of a voltage between terminals of a squib provided in the airbag controller.

* * * * *